Sept. 20, 1966   E. E. HOOD   3,273,680

HUB AND BRAKE FOR VELOCIPEDES AND THE LIKE

Filed May 6, 1965

WITNESS:
Esther M. Stockton

INVENTOR.
Edwin Elliott Hood
BY
W. S. Thompson
ATTORNEY

United States Patent Office 3,273,680
Patented Sept. 20, 1966

3,273,680
HUB AND BRAKE FOR VELOCIPEDES
AND THE LIKE
Edwin Elliott Hood, Elmira, N.Y., assignor to The Bendix Corporation, Elmira, N.Y., a corporation of Delaware
Filed May 6, 1965, Ser. No. 453,717
9 Claims. (Cl. 192—6)

The present invention relates to a hub and brake for velocipedes and the like and, more particularly, relates to a novel arrangement of the driving and braking members within a hub.

The modern trend in velocipede design is toward lighter and faster units having multi-speed drives. Modern economic demands require such units to be produced at a lower cost. Increasing the number of driving speeds increases the complexity of the hub and the devices contained therein and crowds the brake structure within the hub. It had appeared necessary to increase the size of the hub to accommodate both the multi-speed drive and brake mechanism. Increasing the size of the hub increased both the weight and cost of the units. Increasing the number of speeds of the driving mechanism, as well as reducing the weight of the unit, has increased the speeds at which such units are operated, requiring greater effective braking power and efficiency. Prior art devices frequently employed disc-type brakes having multiple disc packs which were heavier, more expensive to produce, and difficult to cool. While shoe-type brakes are less expensive to manufacture and assemble, it was formerly believed that they required greater hub length than disc pack brakes.

The present invention accommodates these seemingly contradictory design and cost requirements by placing a portion of the driving mechanism within the brake structure.

An object of the present invention is, therefore, to provide a hub and brake mechanism for velocipedes and the like which employ shoe brakes in a hub of the same size as formerly required for disc pack-type brakes.

Another object of the present invention is to provide greater available braking area for a shoe-type brake contained within a hub for velocipedes and the like.

Another object of the present invention is to provide a brake and drive mechanism within a hub for velocipedes and the like which can be manufactured and assembled at a lower cost than prior art units.

Another object of the present invention is to provide a novel shoe brake and drive mechanism structure which can accommodate multi-speed drives in a hub of the same size as formerly required by hubs employing disc pack-type brakes.

A further object of the present invention is to provide a drive mechanism and shoe-type brake contained within a hub for velocipedes and the like which is simple, durable, efficient and positive in operation.

A still further object of the present invention is to eliminate the need for the dual-retarder coupling member employed in prior art multi-speed drive and disc-type brake mechanisms.

Additional objects and advantages will be apparent from the detailed description which follows in conjunction with the accompanying drawing wherein one embodiment of the invention is illustrated.

The following description is taken in connection with the accompanying drawing in which.

Figures 1, 2, 3:
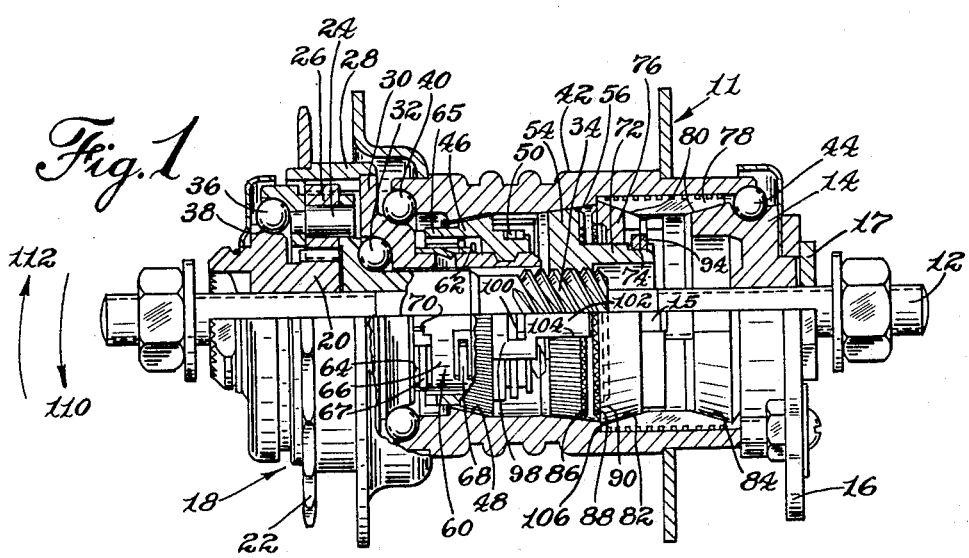
FIGURE 1 is a front elevational view, partly broken away and in section, of an embodiment of the invention, illustrating a portion of the driving mechanism in driving engagement with a portion of the hub.
FIGURE 2 is a detailed view of a portion of a driving clutch, a screwshaft, a movable brake expander member, and a retarder spring being an embodiment of part of the present invention.
FIGURE 3 is a sectional view, partly broken away, taken on the plane 3—3 of FIGURE 2, illustrating the brake expander member engaged by a portion of the driving mechanism in a brake engaging position.

Turning now to FIGURE 1, there is illustrated a partly broken away and sectioned semi-automatic two-speed hub and brake generally designated 11. A non-rotating axle 12, adapted to be mounted in the frame of a velocipede or the like, supports an axially-fixed or immovable non-rotatable brake expander member 14. The brake expander is secured against rotation by a brake arm 16 mounted and retained thereon by a clamp nut 17. The brake arm is connected to the frame of the velocipede or the like.

A driving section, generally designated 18, includes a sun gear 20 mounted on the axle 12. A rotatable driving member or sprocket 22 has a ring gear 28 formed on its inner surface which engages planetary gears 26 which are, in turn, secured to planet carrier 24. Ring gear 28 has a first screw-shaft 30 formed thereon and is mounted by bearing 32 about a second screw-shaft 34 formed on the planet carrier 24. Bearings 36 support the sprocket about a bearing race 38 formed about the sun gear 20 and bearings 40 support the hub 42 about the ring gear 28. Bearing 44 supports the other end of hub 42 about the fixed brake expander member 14. The driving section could be arranged so that a ring gear is mounted or formed on the first screw-shaft and the sprocket is mounted on or formed integrally with the second screw-shaft. That arrangement would provide for a direct drive and an overdrive mechanism, while FIGURE 1 shows a low speed drive and a direct drive mechanism.

A speed selector section, shown generally by the numeral 60, includes a thimble 62, a shoulder 64 formed on the first screw-shaft, axially-extending arcuate segments 65 formed on the first driving clutch member and a selector spring 66. The selector spring has inwardly-depending fingers 67 adapted to engage the thimble 62 and outwardly-extending fingers 68 for gripping a knurled surface formed inside of the first driving clutch member 46 and radially-extending arms 70 for blocking the axial movement of the first driving clutch member by contacting the axially-extending arcuate segments 65, preventing the further axial movement of the first driving clutch member on the first screw-shaft 30 in the direction of the first clutch surface 48. FIGURE 1 shows the hub being driven by the second driving clutch member. If the operator desires to shift to the first driving clutch member, he rotates the sprocket 22 slightly in the direction shown by arrow 112 which causes the first driving clutch member's axially-extending arcuate segments to index relative to the selector spring arm through the actions of the spring selector member 60 and the first and second retarder springs so that the axially-extending arcuate segments 65 fit between the arms 70 of the selector spring 66, thereby permitting the engagement of the first driving clutch member 46 and the first driving clutch surface 48. Thus, the purpose of the selector mechanism 60 is to alternately block and permit the first driving clutch member's contact with the first clutch surface. The speed selecting mechanisms form no part of the present invention and, therefore, are not described in further detail. Detailed description of similar speed selector mechanisms may be found in U.S. Patent 2,972,908, issued to Hood and Gleasman; U.S. Patent 2,957,560, issued to Gleasman; and U.S. Patent 3,022,682 issued to Hood and Gleasman.

The second driving clutch member 54 has an axially-extending annulus 72 formed thereon. The annulus has a circumferential radially-inwardly-extending notch 74 formed therein. An axially-moveable annular brake expander member 76 is journalled about the axially-extending portion or annulus of the second driving clutch member. Four segmental brake shoe members 78 are fitted between the brake expander members 76 and 14. The brake shoe members have oblique inner surfaces 80 to cooperate with corresponding oblique outer surfaces 82 and 84 of the respective brake expander members so that the brake shoes will expand radially to frictionally engage the hub 42 when the axially-moveable brake expander member 76 is moved axially toward the fixed brake expander member 14. Both brake expander members 14 and 76 have finger-like axial projections similar to that finger-like projection 15 shown on brake expander member 76 which engage the shoe members 78 and thereby prevent the rotation of expander member 76.

A dentiled surface 86 is formed on the brake expander end of the second driving clutch member 54 to engage a dentiled surface 88 formed on an outer annular portion 90 of the axially-movable brake expander member 76. The outer annular portion 90 extends axially toward the second driving clutch member from an inner annular portion 91 which has radially-extending slots 92 formed therein. The slots 92 are adapted to engage the second helical retarder spring 94 having radially-outwardly-extending tangs 96. The second retarder spring 94 is frictionally connected in the second driving clutch member notch 74. The second driving clutch member 54 is linked to the first retarder spring 50 by an arcuate coupling member 98 having slots 100 formed therein and an axially-extending arm 102 engaging axially-extending slots 104 formed on the second driving clutch member 54. The slots 104 are sufficiently deep in a radial direction so that coupling member 98 does not interfere with the engaging of clutch surfaces 86 and 88 formed on the second driving clutch member 54 and the movable brake expander member 76 respectively.

In operation, when the driving section 18 is rotated in the direction indicated by arrow 110, the screw-shafts 30 and 34 are rotated in the same direction but at different speeds. The second retarder spring 94 resists the rotation of the second driving clutch member 54. The coupling member 98 links the retarded second driving clutch member to the first retarder spring 50 which, in turn, retards the rotation of the first driving clutch member 46. Each clutch member, therefore, advances axially on its respective screw-shafts 30 and 34 towards its respective clutch surfaces 48 and 56. The speed selector mechanism 60, alternately subject to the operator's control, positions the spring arms 70 for either blocking or permitting the axial movement of the first driving clutch member toward the first clutch surface, thereby selecting either the first or second driving clutch member. When the operator determines to brake the sub, he rotates the driving section 18 in the direction shown by arrow 112. The retarders disengage the driving clutch member from the hub surface by causing the clutch members to advance on their respective screw-shafts axially toward the brake expander member. The second driving clutch member 54 approaches the position shown in FIGURE 3 where its dentiled surface 86 is in contact with dentiled surface 88 of the axially-moveable brake expander member 76. Additional axial movement of the second driving clutch member drives the moveable brake expander member toward the fixed brake expander member 14, causing the brake shoes 78 to be cammed outwardly by the oblique surfaces 80, 82 and 84 formed on the brake shoes and brake expander members respectively. The brake shoes frictionally engage the hub to stop its rotation.

It can be readily appreciated that by disposing the moveable brake expander member 76 and a portion of the brake shoes 78 radially outwardly of a portion of the second driving clutch member 72 and the second retarder spring 94, greater hub space was made available for the shoe-type brake, yet sufficient axial length was maintained for the screw-shaft and retarders so that the driving clutch members were able to move axially toward and away from the brake expander members to either drive or brake the hub. It can be readily seen that this invention attained its stated objects of obtaining additional hub space for the braking mechanisms to permit the use of a less expensive, longer lasting and more efficient shoe brake mechanism in multi-speed hub drives and brakes for velocipedes and the like. In addition, the present invention employs the second retarder spring member 94 as a lock ring to prevent the second driving clutch from moving axially out of the moveable brake expander member. A shoulder 106, formed in the hub adjacent the moveable expander member 76, limits the axial movement of the moveable expander member and thereby prevents malfunction of the brakes due to dislocation of the brake shoes. Still further, the present invention eliminated the need for a dual coupling member formerly used for coupling the second retarder to the second driving clutch member. The elimination of that additional coupling member was made possible by the present invention direct linking of the retarder spring to both the moveable brake expander member and the second driving clutch member.

A comparison U.S. Patent 2,982,384 to Hood and U.S. Patent 3,166,166 to Gleasman indicates the hub area saved by the present invention to provide more hub area for braking surface. Axial space, formerly needed for retarder springs, pressure plates, retarder couplings, and clutch mechanisms, is now made available for braking area. Thus, the present invention permits the use of the lighter, less expensive, more easily assembled and more efficient shoe brake mechanism in a hub of the same size required for disc pack-type brakes.

Although certain structures have been shown and described in detail, it will be understood that changes may be made in the design and arrangement of parts without departing from the spirit of the invention.

I claim:
1. In a hub for driving and braking velocipedess and the like comprising:
 a non-rating axle:
 a hub mounted on the axle having a clutch surface;
 rotating driving means mounted about the axle having axially-extending screw-shaft means;
 driving clutch means journalled on said screw-shaft means;
 an axially-moveable, non-rotatable brake expander means mounted within the hub;
 an axially-fixed, non-rotatable brake expander means mounted within the hub;
 brake shoe means mounted between said expander means adapted to frictionally engage the hub when the moveable expander means is moved axially relative to the fixed expander means;
 the driving clutch means having an axially-extending member fitted through the moveable expander means; and
 retarder means journalled on the axially-extending member of the driving means, engaging the moveable expander means for causing the driving clutch means axial movement on the screw-shaft toward and away from the moveable expander means for driving and braking the hub in response to the direction of rotation of the driving means.

2. The device described in claim 1 wherein:
 the moveable expander means having an annular outer surface and an annular inner surface, the annular outer surface extending axially towards the driving clutch means from the inner annular surface;
 the annular inner surface having a radially-extending slot formed thereon; and
 the retarder means comprising a helical spring member having a radially-outwardly-extending tang engaging said slot.

3. The device described in claim 2 wherein:

the axially-extending member of the driving clutch means having a radially-extending circumferential notch formed radially inwardly of the brake shoe means;

the retarder spring means slidably journalled in said notch for frictionally resisting the rotation of the driving clutch means relative to the screw-shaft means;

the retarder spring tang adapted to cooperate with the expander means slot and the driving clutch means notch to limit the axial separation of the driving clutch means and the moveable expander means; and abutment means formed in the hub to limit the axial movement of the moveable expander member relative to the fixed expander member.

4. In a multi-speed hub for driving and braking velocipedes and the comprising:

a non-rotating axle;

a hub mounted on the axle having first and second clutch surfaces;

rotating driving means mounted about the axle having axially-extending first and second screw-shaft means;

an axially-moveable, non-rotatable brake expander means mounted within the hub;

an axially-fixed, non-rotatable brake expander means mounted within the hub, brake shoe means mounted between said expander means adapted to frictionally engage the hub when the moveable expander means is moved axially relative to the fixed expander means;

first and second driving clutch means journalled on the first and second screw-shaft means respectively, each driving clutch means having an axially-extending annulus;

first and second retarder means journalled on the axially-extending annulus of the first and second driving clutch means;

the axially-moveable expander means disposed about said second driving clutch means axially-extending annulus and said second retarder means and adapted to engage said second retarder means;

retarder coupling means fitted through axial slots in the second driving clutch means adapted to engage said first retarded means; and said first and second retarder means operative to frictionally engage said first and second clutch means to cause axial movement of said clutch means on the respective screw-shaft means toward and away from the moveable expander means for driving and braking the hub in response to the direction of rotation of the driving means.

5. The device described in claim 4 wherein:

said second retarder means comprises a helical spring having radially-outwardly-extending tang;

said moveable expander member comprises an outer annular transverse surface axially extending toward the clutch means from an inner annular transverse surface having a radially-slotted surface adapted to engage said tang;

the axial slots of the second driving clutch means extending radially-inwardly further than the outer annular transverse surface of the moveable expander means; and the retarder coupling means seated in the driving clutch slots radially inward of the outer annular transverse surface of the moveable expander means.

6. The device described in claim 5 wherein:

said second driving clutch annular surface has a circumferential notch formed therein adapted to engage said second retarder means;

said second retarder means operative in cooperation with the notch and the expander means slot to confine said annular surface within said expander means; and an abutment means formed in the hub adapted to engage said moveable expander means to limit the axial movement of said moveable expander means away from said fixed expander means.

7. In a hub for driving and braking velocipedes and the like comprising:

a non-rotating axle;

a hub having a clutch surface formed thereon;

a screw-shaft means journalled on the axle;

a driving clutch means threaded on the screw-shaft adapted to engage the hub clutch surface;

axially-moveable brake expander means;

fixed brake expander means;

shoe brake means mounted between the brake expander means;

said driving clutch means having an axially-extending cylindrical portion;

said moveable brake expander means journalled on said cylindrical portion;

retarder means adapted to engage the moveable expander means and the driving clutch means for causing the aixal movement of the driving clutch means on the screw-shaft means; and the moveable expander member having its transverse end adjacent the driving clutch means adapted to be engaged by the driving clutch means for braking the hub.

8. In a hub for driving and braking velocipedes and the like comprising:

a non-rotating axle;

a hub having a clutch surface formed thereon;

a screw-shaft means journalled on the axle;

axially-moveable brake expander means;

fixed brake expander means;

a driving clutch means adapted to engage the hub clutch surface having an axially-extending cylindrical portion;

said moveable brake expander means journalled on said cylindrical portion;

shoe brake means mounted between the brake expander means radially outwardly of said axially-extending cylindrical portion;

retarder means adapted to engage the moveable expander means and the driving clutch means for causing the axial movement of the driving clutch means on the screw-shaft means; and the moveable expander means having its transverse end adjacent the driving clutch means adapted to be engaged by the driving clutch means for braking the hub.

9. In a hub for driving and braking velocipedes and the like having a frame comprising:

a non-rotating axle;

a hub having a clutch surface formed thereon;

a screw-shaft means journalled on the axle;

a driving clutch means adapted to engage the hub clutch surface having an axially-extending cylindrical portion;

an axially-moveable brake expander means having a plurality of axial projections formed thereon;

an axially-fixed brake expander means having a plurality of axial projections formed thereon;

a brake arm means fixedly interconnecting the frame and the fixed brake expander means to prevent rotation of the axially-fixed brake expander means;

a plurality of shoe brake members mounted between the brake expander means engaging the axial projections of the axially fixed and the axially moveable brake expander means to prevent the rotation of the axially-moveable brake expander means, said shoe brake means mounted radially outwardly of said axially-extending cylindrical portion;

retarder means adapted to engage the axially-moveable brake expander means and the driving clutch means for causing the axial movement of the driving clutch means on the screw-shaft means; and the axially-moveable brake expander means having its transverse end adjacent the driving clutch means adapted to be engaged by the driving clutch means for braking the hub.

References Cited by the Examiner

UNITED STATES PATENTS

| | | | |
|---|---|---|---|
| 2,903,107 | 9/1959 | Gleasman | 192—6 |
| 2,982,384 | 5/1961 | Hood | 192—6 |
| 3,022,682 | 2/1962 | Hood et al. | 192—6 |

DAVID J. WILLIAMOWSKY, *Primary Examiner.*

A. T. McKEON, *Assistant Examiner.*